No. 886,155.  PATENTED APR. 28, 1908.
R. G. RICKS.
LAND MARKER.
APPLICATION FILED JULY 11, 1907.
2 SHEETS—SHEET 1.
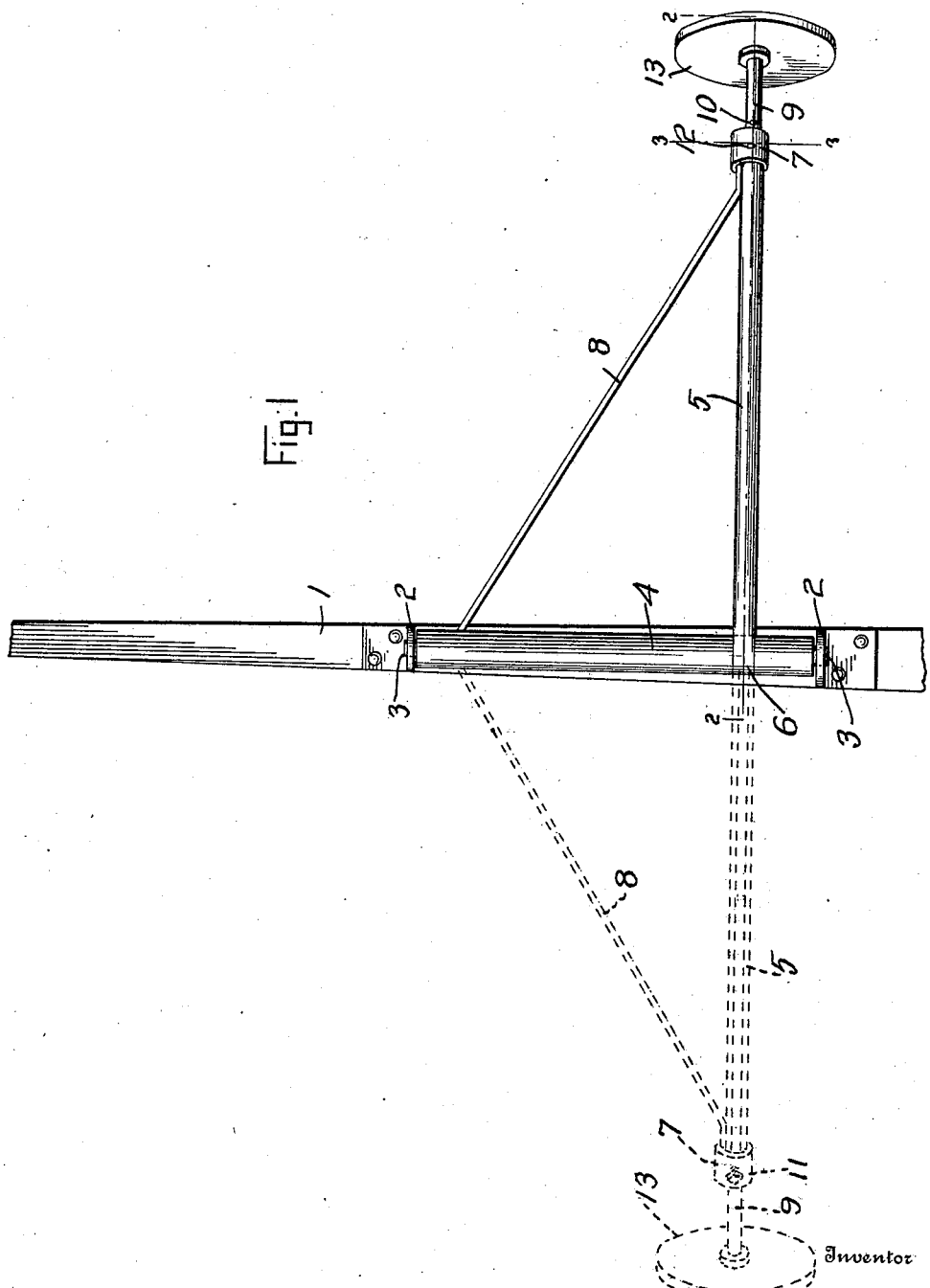

No. 886,155. PATENTED APR. 28, 1908.
R. G. RICKS.
LAND MARKER.
APPLICATION FILED JULY 11, 1907.
2 SHEETS—SHEET 2.
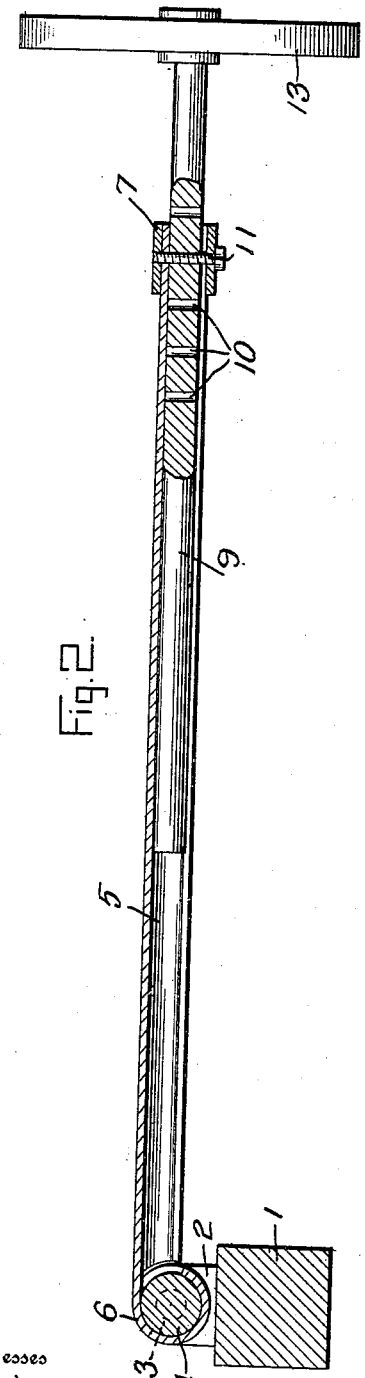
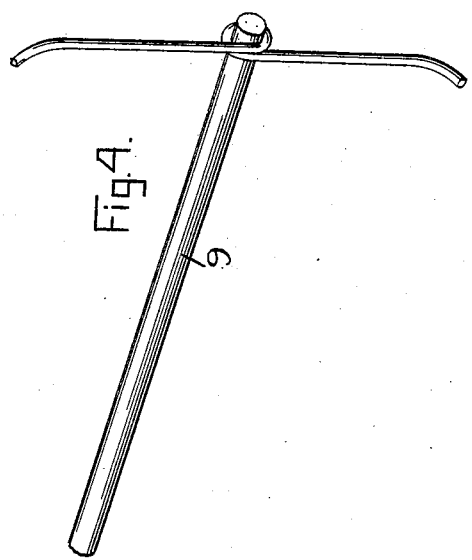
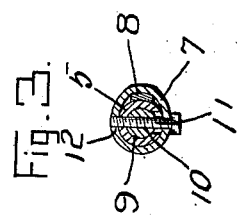
Witnesses
Inventor
R. G. Ricks
By
Attorneys

UNITED STATES PATENT OFFICE.

ROBERT G. RICKS, OF MURPHY, GEORGIA.

LAND-MARKER.

No. 886,155.   Specification of Letters Patent.   Patented April 28, 1908.

Application filed July 11, 1907. Serial No. 383,203.

*To all whom it may concern:*

Be it known that I, ROBERT G. RICKS, a citizen of the United States, residing at Murphy, in the county of Colquitt, State of Georgia, have invented certain new and useful Improvements in Land-Markers; and I do hereby declare the following to be a full, clear, and exact description of the invention, such as will enable others skilled in the art to which it appertains to make and use the same.

This invention relates to new and useful improvements in land markers and it has particular reference to an attachment for use in connection with plows to mark the width of the furrows.

The invention in its general embodiment comprises a reversible bracket which can be swung to a position on either side of the plow and an arm carrying a marking device and adjustably engaged with said bracket.

In connection with a device constructed as generally above described, the invention has for its object to provide a novel construction, combination and arrangement of parts, the details of which will appear in the course of the following description, in which reference is had to the accompanying drawings, forming a part of this specification, like characters of reference designating similar parts, throughout the several views, wherein:—

Figure 1 is a plan view showing the manner of use of the attachment comprehended in the present invention. Fig. 2 is a sectional view showing the manner of adjustably connecting the arm to the bracket, and on the line 2—2 of Fig. 1. Fig. 3 is a section on the line 3—3 of Fig. 1, showing the connection between a brace and the bracket above referred to. Fig. 4 is a detailed view of a marking member which may be employed in lieu of the wheel shown in Figs. 1 and 2.

In the accompanying drawings, the numeral 1 designates the beam of the plow, the latter carrying on its upper face opposed bracket bearings 2, which are formed to receive the trunnions 3 of a rotatable member 4. The bracket above referred to is constructed of a bar 5, of U shape in cross section one end of which is formed as a loop 6 and rigidly engaged with the member 4. Surrounding the bar 5 at its end is a sleeve or clip 7, which embraces the angular end of a diagonal brace member 8, the other end of said brace member being connected with the member 4. The sleeve 7 constitutes a keeper for a rod 9, which is slidably mounted with relation to the bar 5, and which is formed with a plurality of openings 10 arranged at determinate intervals. A set screw 11 is threaded through an opening 12 in the clip 7 for engagement in a selected one of the openings 10 in the rod 9. The rod 9 carries on its projecting end a marking wheel 13 for indicating the line of the furrow and in lieu of which the bar 14 illustrated in Fig. 4 may be employed if desired.

It will be apparent that by manipulating the set screw 11, the rod 9 may be moved with relation to the bracket 5 to increase or decrease the width of the furrow as defined by the wheel on the end of said rod. The provision of the rotatable member 4 affords means for setting the bracket 5 and the rod 9 on either side of the plow beam as is desired.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. The combination with a plow beam, of a rotatable member mounted thereon, a bracket of U shape in cross section having an end formed for engagement with said member and having an end projecting laterally therefrom, a brace between said member and said bracket, a clip engaged with one end of said bracket, a rod projected through said clip and slidable with relation to said bracket, said rod carrying on its projecting end a marking device and being formed along its body portion with a plurality of determinately spaced openings, and a set screw threaded through said clip and designed to engage selectively in said openings.

2. The combination with a plow beam, of bracket bearings secured to the upper face thereof, a rotatable member having end trunnions journaled in said bracket bearings, a laterally projecting bracket of inverted U-shape in cross section having one end surrounding and fixed to said member and having its other end provided with an annular clip, a brace between said member and said bracket, said clip surrounding said brace, a rod projected through said clip and slidable with relation to said bracket, a marking device provided on the outer end of said rod, said rod being formed along its body portion with a plurality of determinately spaced openings and a set screw threaded through said clip and passing through a selected one of said openings.

In testimony whereof, I affix my signature, in presence of two witnesses.

ROBERT G. RICKS.

Witnesses:
S. E. DUREN,
W. R. RASENCRANTY.